H. B. JONES.
FRUIT SEEDER OR PITTER.
APPLICATION FILED JAN. 10, 1917.
1,220,854.  Patented Mar. 27, 1917.
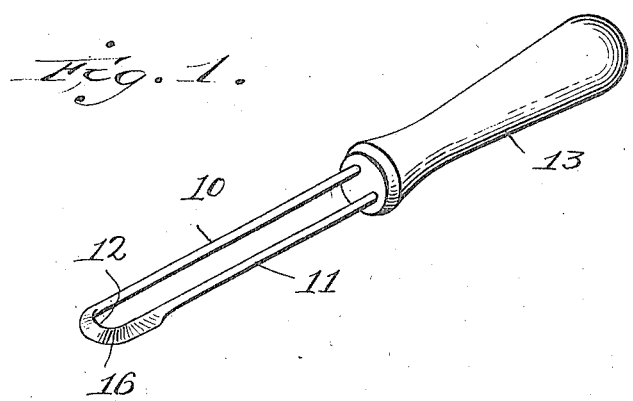
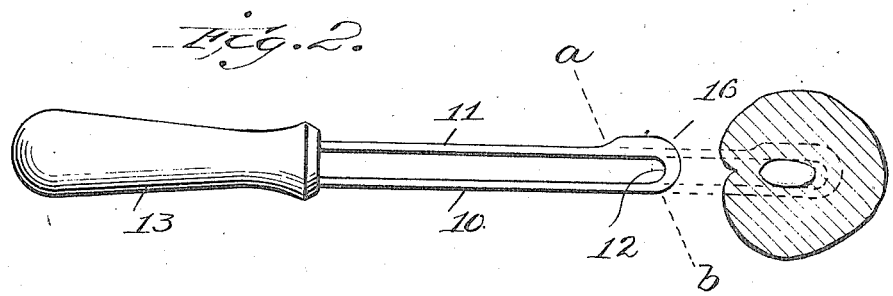
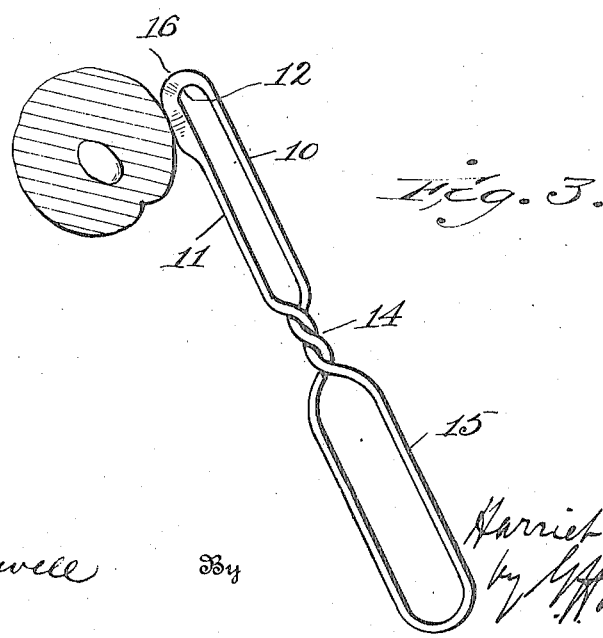

UNITED STATES PATENT OFFICE.

HARRIET B. JONES, OF BALTIMORE, MARYLAND.

FRUIT SEEDER OR PITTER.

1,220,854. Specification of Letters Patent. Patented Mar. 27, 1917.

Application filed January 10, 1917. Serial No. 141,658.

*To all whom it may concern:*

Be it known that I, HARRIET B. JONES, a citizen of the United States, residing at Baltimore, in the State of Maryland, have invented new and useful Improvements in Fruit Seeders or Pitters, of which the following is a specification.

This invention relates to an improvement in fruit pitters and has for its object the production of a simple, cheap and efficient instrument for removing the pit in a cleanly manner and without mutilating the fruit.

In the accompanying drawing Figure 1 is a perspective view of the improved device. Fig. 2 is a plan view of the same showing one mode of effecting entrance into the fruit. Fig. 3 is a similar view showing a modified form of handle and another way in which the operative part may enter the fruit.

Referring to the drawing, the blade, preferably, is made of wire and bent into U-form whereby to provide elongated side members 10 and 11 which lie in parallel relation to each other, and have a curved connection at 12. The inner ends of the members 10 and 11, as shown in Figs. 1 and 2, are inserted in a wooden handle 13, or such ends, as shown in Fig. 3, may be twisted to form a shank 14, and continued to form a loop-shaped handle 15.

At the curved end 12 of the device the wire is flattened to form a slitting blade 16 which preferably extends from the point *a* to the point *b*, as indicated in Fig. 2 by the dotted lines. Thus the blade extends around the end of the instrument and partially along its member 11. This shape of the blade provides end and side slitting edges. The side slitting edge increases the width of the operative end of the instrument so as to cut the fruit in a path wide enough in advance of the side members 10 and 11 so that they may pierce the fruit without tearing action.

The device may be used in several ways in extracting the pit or seed. As shown in Fig. 2, the blade is positioned with respect to the fruit so as to allow it to be pushed thereinto endwise. In this mode of use the curved portion of the blade is the entering edge and will readily slit the fruit without mutilating it. The blade is forced in in a direct line and cuts the meat from the pit, and when the blade has reached the position shown in dotted lines the pit is caught in the looped end and may be extraced.

Sometimes it is desirable or necessary to slit the fruit from the side. This is readily done by employing the side blade as seen in Fig. 3 and still retaining the longitudinal axis of the pit and loop of the blade in parallel relation so that the pit may engage within the loop in position allowing it to be removed.

This device more especially is adapted for extracting the pits or stones from small fruits such as cherries, damsons, etc., and in practice has been found to be an efficient and quickly operative instrument, and that the seeds, pits or stones when removed are clean and free from pulp with the result that the fruit is left as nearly as is practicable in uninjured condition.

This seeder or pitter may be cheaply manufactered, is strong and durable, and its simplicity in construction and operation is such that it may be placed in the hands of and readily used by anyone without previous practice.

Having thus described my invention, I claim:—

1. A device of the character described, comprising a handle and a member having straight parallel sides and formed into a loop at its outer end, said outer end being formed with a slitting blade which extends continuously from the end of one of said sides and around said end and along a portion of the other side of said member.

2. A device of the character described, comprising a handle and a member straight throughout its length and provided with a loop at its outer end, said outer end being formed with a slitting blade which extends continuously from the end of one of said sides and around said end and along a portion of the other side of said member.

3. A device of the character described, comprising a handle and a member having straight parallel sides and formed into a loop at its outer end, said outer end being formed with a slitting blade wider than the body of said member.

4. A device of the character described, comprising a handle and a member formed of wire bent in U shape to provide two straight parallel side members and a curved outer end connecting said members and forming a looped outer end, lying in the same plane as said side members, the wire forming said outer end being flattened to provide a slitting blade which extends around the end of said loop from the end of one of said side members and along a portion of the other one of said side members.

In testimony whereof I affix my signature in presence of two witnesses.

HARRIET B. JONES.

Witnesses:
JOHN W. BOSLEY,
EDGAR H. CROMWELL.